Oct. 5, 1943.        J. S. NEWTON        2,330,991
ELECTRIC COUPLING TORQUE INDICATING DEVICE
Filed Dec. 19, 1939

WITNESSES:
N. F. Sussan
Wm. J. Ricano

INVENTOR
John S. Newton.
BY
Paul E. Friedemann
ATTORNEY

Patented Oct. 5, 1943

2,330,991

UNITED STATES PATENT OFFICE 2,330,991

ELECTRIC COUPLING TORQUE INDICATING DEVICE

John S. Newton, Drexel Hill, Pa., assignor to Westinghouse Electric & Manufacturing Company, East Pittsburgh, Pa., a corporation of Pennsylvania Application December 19, 1939, Serial No. 310,016

10 Claims. (Cl. 265—25)

My invention relates to a torque indicating device for an electromagnetic coupling such as, for example, those used in ship propulsion drives and the like.

In ship propulsion drives there is an increasing demand for indicating instruments which will give an accurate measurement of the torque being transmitted to the propeller shaft and the thrust of the propeller. Furthermore, there is an increased demand for torque indicating instruments which are as simple as possible, which require a minimum amount of space, but which are reliable in operation.

An object of my invention is to provide a torque indicating device for indicating the torque transmitted by an electromagnetic coupling which torque indicating device is to be not only simple and involving a minimum number of parts, but which is reliable in operation as well.

Another object of my invention is to provide a torque indicating device which will indicate the total torque transmitted by a plurality of electromagnetic couplings in a mechanical drive such as a ship propulsion drive.

Other objects and advantages will become more apparent from a study of the following specification when considered in conjunction with the accompanying drawing, in which.

Figure 1:
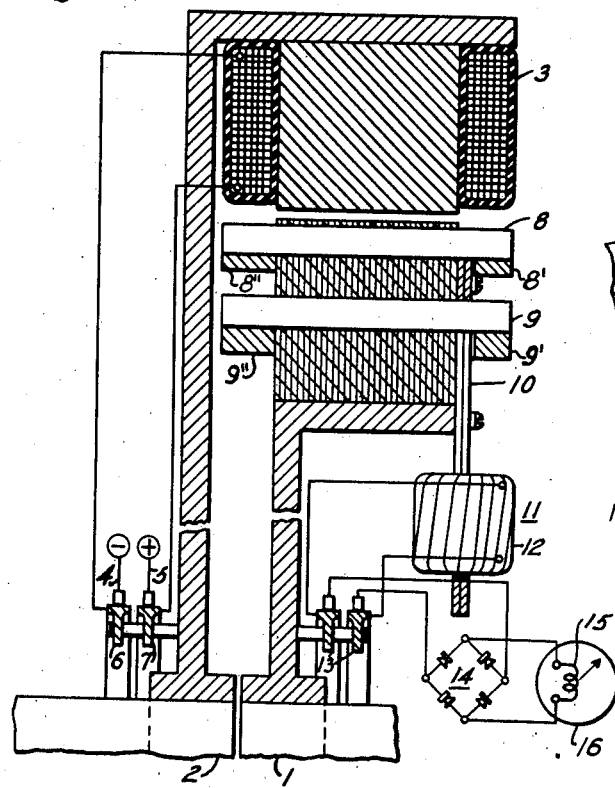
Figure 1 is a sectional view taken along line I—I of Fig. 2 of a portion of an electromagnetic coupling which includes the apparatus embodying the principles of my invention.
Figure 2:
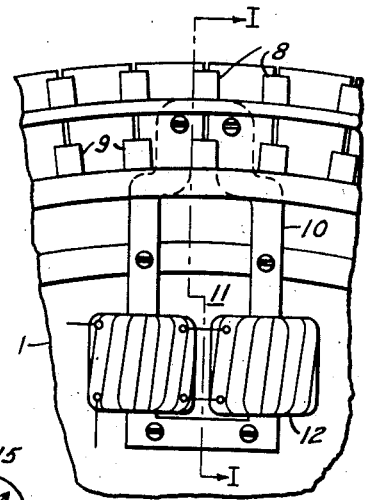
Fig. 2 is a side view of a portion of the driving element shown in Fig. 1.

Referring more particularly to Figures 1 and 2, numeral 1 denotes the driving element of an electromagnetic coupling which may be coupled to a Diesel engine or other prime mover (not shown) and numeral 2 denotes the driven element of such electromagnetic coupling which is mechanically coupled to a propeller or other load device (not shown). It will be apparent, however, that the element 2 could be a driving element and element 1 the driven element instead, if so desired. The driven element has mounted thereon a plurality of field windings such as 3 and which are energized from a direct current source of potential denoted by terminals 4 and 5 which are applied by suitable brushes to slip rings 6 and 7, respectively, hence to the various field windings such as 3.

Figure 4:
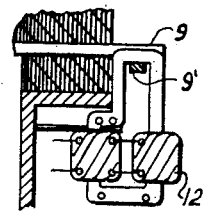
Fig. 4 shows a modification of my invention.

The driving element 1 has mounted thereon a double-layered squirrel-cage winding, the upper layer of which comprises a plurality of circumferentially spaced damper bars 8 which are of high resistance and low reactance, and which are connected to end rings 8' and 8", and the lower layer of which comprises a plurality of circumferentially spaced damper bars 9 which are of high reactance and low resistance and are connected to end rings 9' and 9". Encircling one (or a plurality) of the damper bars 9 or the end ring 9' is the iron core 10 of a current transformer 11. In Fig. 4 I show a construction for mounting the iron core of the transformer about the end ring 9'. When thus mounted the space between the end ring and the rotor laminations may have to be somewhat greater. The iron core is preferably insulated from the end rings of the squirrel-cage windings. The secondary winding of the current transformer is indicated by the numeral 12.

The current induced in the encircled damper winding (or windings) 9 during operation, I have found, is substantially proportional to the torque transmitted by the electromagnetic coupling, particularly the torques ranging from 50% of the rated full load torque to full load torque. Of course, it is assumed that the torque will not exceed its pull-out value, since the current is proportional to the torque, at most, only up to the pull-out value of torque. The secondary winding 12 of the current transformer has terminals connected to slip rings 13, and the output of winding 12 will be a measure of torque transmitted. A rectifier 14, which may be of the copper oxide type or any other suitable type, has input terminals which are connected to slip rings 13 and output terminals which are connected to coil 15 which forms the current element of a direct current ammeter 16. Since the secondary frequency at rated torque is usually less than 1 cycle per second, the movable pointer of ammeter 16 will follow the rectified current wave. In other words, the pointer will swing from zero to a maximum and back to zero again for every cycle of induced (rectified) alternating current in the secondary winding 12. The maximum swing of the meter will be a visible indication of the torque being transmitted by the coupling. Consequently, the meter may be calibrated in any suitable units of torque desired.

Ammeter 16 may be a standard milliammeter since the frequency is quite low, hence would not involve appreciable error due to over-swing.

It will be apparent that it is also possible to eliminate the rectifier entirely and merely supply a zero-center meter which will give an indication of torque by the swing of the meter to each side of zero.

The mechanical drives such as ship propulsion drives including a plurality of electromagnetic couplings, because of the use of a plurality of prime movers, it is desirable to read not only the torque transmitted by each coupling, but the average torque transmitted by the total number of couplings while they are driving a single load such as a propeller shaft.

Figure 3:
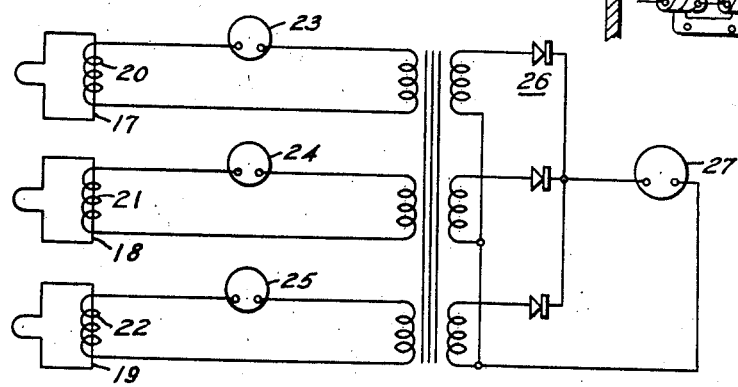
Fig. 3 is a schematic showing of a drive that includes three electromagnetic couplings, and which also includes a torque measuring device in accordance with the principles of my invention for indicating the total torque transmitted by the respective couplings.

Fig. 3 illustrates schematically a method of accomplishing these torque readings. Numerals 17, 18 and 19 denote the course, corresponding to 10 (that is, those including the damper bar or bars) of three different electromagnetic couplings (not shown) similar to that described in connection with Figs. 1 and 2. Numerals 20, 21 and 22 denote the secondary windings of the respective current transformers similar in character to winding 12 of current transformer 11. Numerals 23, 24 and 25 denote meters of any suitable design either including or excluding a rectifier such as rectifier 14 for measuring the current flowing through the respective secondary windings. A three-phase Y-connected transformer and rectifier unit 26 is fed by the currents flowing through the respective secondary windings of the current transformers. Across the output terminals of the three-phase transformer and rectifier unit 26 is connected a meter 27 such as a direct current ammeter.

It will be apparent that meter 27 will have applied to its current element a three-phase rectified current, thereby imposing upon the pointer thereof a smaller degree of swing than in the single-phase system illustrated in Figs. 1 and 2. In such arrangement it is desirable to have a meter with enough damping that the needle will remain stationary at a constant load instead of reading maximum value as in the single-phase scheme. Meter 27 can be suitably calibrated so as to indicate the total value of torque transmitted by their respective electromagnetic couplings. One reason that maximum reading is not desirable is that there is generally no fixed relationship between the phase displacement of the impulses from the couplings. For example, if all couplings are transmitting equal power, the impulses may be in phase or in any combination of phase displacement and the maximum reading may vary from 100% (for all impulses in phase) to less than 70% for equal displacement between phases. The average reading, however, will be equal.

It will be apparent that by such a system as illustrated in Fig. 3 the operator may readily make minor adjustments by noting the readings of meters 23, 24 and 25 so that each prime mover will carry its proportional share of the total load.

While squirrel-cage windings 8 and 9 have been described, it will be apparent that my invention is applicable to wound rotor windings as well. Furthermore, instead of measuring torque, my device is also suitable for measuring slip by counting the impulses per minute.

I am, of course, aware that others, particularly after having had the benefit of the teachings of my invention, may devise other devices embodying my invention, and I, therefore, do not wish to be limited to the specific showings made in the drawing and the descriptive disclosure hereinbefore made, but wish to be limited only by the scope of the appended claims.

I claim as my invention:

1. In a mechanical drive, an electromagnetic coupling which includes two electromagnetically coupled windings, one of which is a squirrel-cage winding, circuit means electromagnetically coupled with at least one turn of said squirrel-cage winding including meter means for measuring the value of the current induced in said circuit means from the squirrel-cage winding, said meter thereby giving an indication of the torque transmitted by said electromagnetic coupling when said torque is in the range from 50% to 100% rated full load torque and below its pull-out value.

2. In a mechanical drive, an electromagnetic coupling which includes two electromagnetically coupled windings, one of which is a squirrel-cage winding, circuit means electromagnetically coupled to an end ring of said squirrel-cage winding including meter means for measuring the value of the current induced in said circuit means from the squirrel-cage winding, said meter thereby giving an indication of the torque transmitted by said electromagnetic coupling when said torque is in the range from 50% to 100% rated full load torque and below its pull-out value.

3. In a mechanical drive, an electromagnetic coupling which includes two electromagnetically coupled windings, one of which is a squirrel-cage winding, circuit means electromagnetically coupled to a portion of said squirrel-cage winding and into which is induced an alternating current proportional to the torque transmitted by said electromagnetic coupling when said torque is in the range from 50% to 100% rated full load torque and below its pull-out value, rectifier means for rectifying said induced alternating current and meter means for indicating the value of said rectified current thereby giving a visible indication of the value of said transmitted torque.

4. In a mechanical drive, an electromagnetic coupling which includes two electromagnetically coupled windings one of which is a double-layered, squirrel-cage winding, one layer being of high reactance, low resistance bars and the other being of low reactance, high resistance bars, circuit means inductively coupled to at least one of the high reactance, low resistance bars including meter means for measuring the value of the current induced in said circuit means from the squirrel-cage winding, said meter thereby giving an indication of the torque transmitted by said electromagnetic coupling when said torque is in the range from 50% to 100% rated full load torque and below its pull-out value.

5. In a mechanical drive, an electromagnetic coupling which includes two electromagnetically coupled windings one of which is a double-layered, squirrel-cage winding, one layer being of high reactance, low resistance bars and the other being of low reactance, high resistance bars, circuit means inductively coupled to at least one of the high rectance, low resistance bars and into which is induced an alternating current proportional to the torque transmitted by said electromagnetic coupling, rectifier means for rectifying said induced alternating current and meter means for indicating the value of said rectified current thereby giving a visible indication of the value of said transmitted torque when said torque is in the range from 50% to 100% rated full load torque and below its pull-out value.

6. In a mechanical drive, an electromagnetic coupling which includes two electromagnetically coupled windings, one of which is a squirrel-cage winding, circuit means electromagnetically coupled with at least one turn of said squirrel-cage winding including meter means for measuring the value of the current induced in said circuit means from the squirrel-cage winding, said meter thereby giving an indication of the torque transmitted by said electromagnetic coupling when said torque is in the range from 50% to 100% rated full load torque and below its pull-out value, the other of said windings being energized by a direct current potential source.

7. In a mechanical drive, an electromagnetic coupling which includes two electromagnetically coupled windings, one of which is energized by a direct current source of potential and the other of which is in the form of a squirrel-cage, a current transformer having at least one turn of the squirrel-cage winding functioning as the primary winding, and a secondary winding into which is induced an alternating current proportional to the torque transmitted by the electromagnetic coupling when said torque is in the range from 50% to 100% rated full load torque and below its pull-out value, indicating means electrically connected to said secondary winding for giving a visible indication of said transmitted torque.

8. In a mechanical drive, an electromagnetic coupling which includes two electromagnetically coupled windings, one of which is energized by a direct current source of potential and the other of which is in the form of a squirrel-cage, a current transformer having at least one turn of the squirrel-cage winding functioning as the primary winding, and a secondary winding into which is induced an alternating current proportional to the torque transmitted by the electromagnetic coupling when said torque is in the range from 50% to 100% rated full load torque and below its pull-out value, circuit means including a rectifier and slip rings for connecting the output of said current transformer secondary winding to the input terminals of the rectifier, and a meter connected across the output terminals of said rectifier thereby giving a visible indication of the rectified output current, thus of the torque transmitted by the electromagnetic coupling.

9. In a mechanical drive including a plurality of electromagnetic couplings, each of which includes a winding energized by a direct current source and another winding in the form of a squirrel-cage, a current transformer having at least one turn of the squirrel-cage winding functioning as the primary winding, and a secondary winding into which is induced an alternating current proportional to the torque transmitted by the electromagnetic coupling, circuit means connected to the various secondary windings including a meter for indicating the combined outputs of said windings thereby giving a visible indication of the average torque transmitted by said plurality of electromagnetic couplings.

10. In a mechanical drive including a plurality of electromagnetic couplings, each of which includes a winding energized by a direct current source and another winding in the form of a squirrel-cage, a current transformer having at least one turn of the squirrel-cage winding functioning as the primary winding, and a secondary winding into which is induced an alternating current proportional to the torque transmitted by the electromagnetic coupling, a polyphase rectifier having an input which is connected to the various secondaries of said current transformers and a meter connected across output terminals thereof thereby giving a visible indication of a polyphase rectified current which current represents the average torque transmitted by said plurality of electromagnetic couplings.

JOHN S. NEWTON.